May 18, 1965     W. G. WEBB ETAL     3,183,569
CLAMP MEANS
Filed April 19, 1962     2 Sheets-Sheet 1
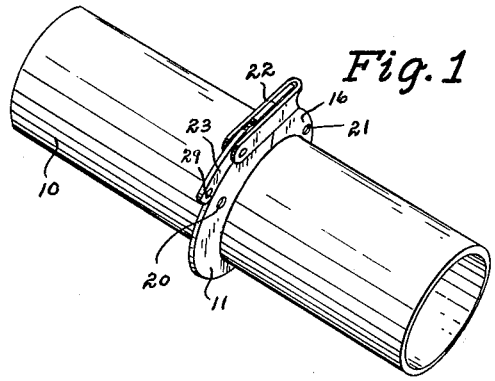
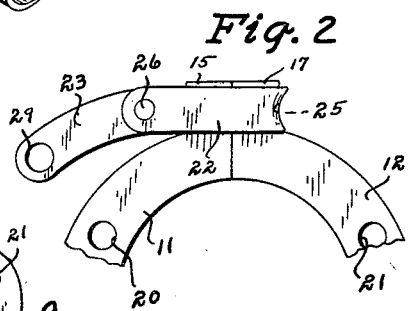
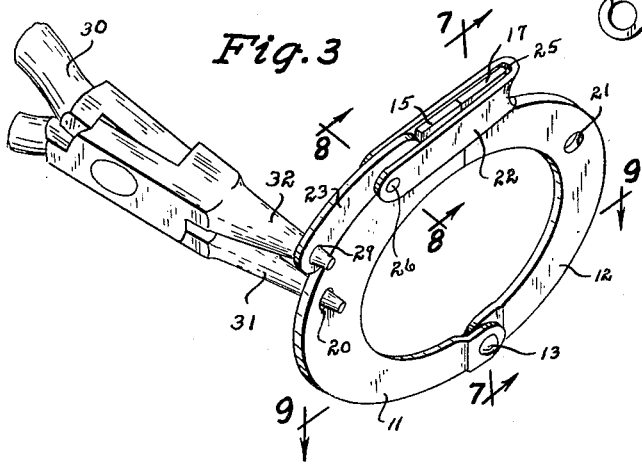
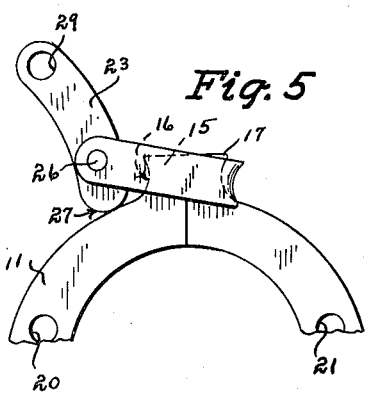
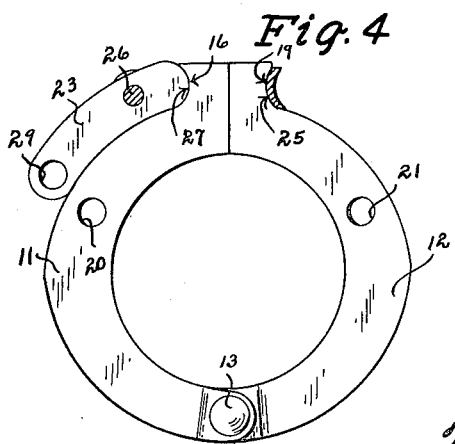
INVENTORS
WILLIAM G. WEBB
MILTON C. ENGMAN
BY
Talbert Dick & Zarley
ATTORNEYS May 18, 1965 W. G. WEBB ETAL 3,183,569
CLAMP MEANS
Filed April 19, 1962 2 Sheets-Sheet 2
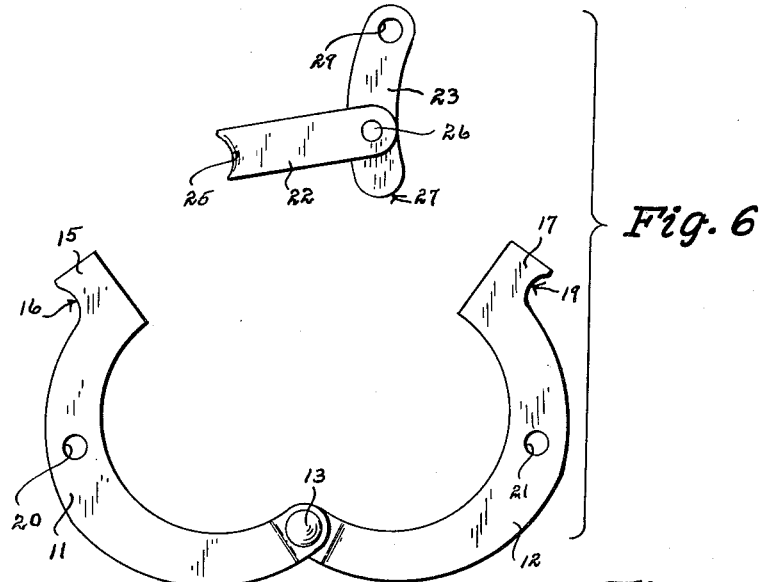
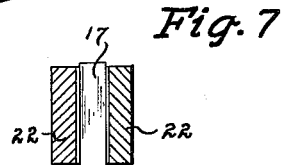
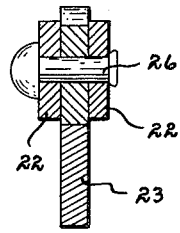
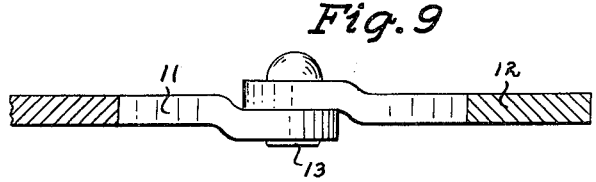
INVENTORS
WILLIAM G. WEBB
MILTON C. ENGMAN
BY
Talbert, Dick & Barley
ATTORNEYS 3,183,569
CLAMP MEANS
William G. Webb and Milton C. Engman, Des Moines,
Iowa, assignors to Engman Manufacturing Company,
Des Moines, Iowa, a corporation of Iowa
Filed Apr. 19, 1962, Ser. No. 188,808
3 Claims. (Cl. 24—270)

This invention relates to a clamping means and particularly to an attachable clamp adapted to be secured around pipes, shafts, posts, tubes and like.

Clamping devices are now used for many purposes. Perhaps one of the most prolific uses of clamping means is to be found in the automotive field for clamping such parts as muffler pipes, tubing, brackets, and like. However, most such clamping devices are expensive, incorporate threaded parts, and are difficult to install.

Therefore, one of the principal objects of our invention is to provide a parabolic jaw clamping means that may be easily and quickly installed.

A further object of this invention is to provide a clamping device that has no threaded bolt means.

A still further object of this invention is to provide a clamp means that takes up very little area space.

A still further object of this invention is to provide a clamping device having a closing means that may be actuated from either side thereof.

Still further objects of our invention are to provide a clamping device that is economical in manufacture, durable in use, and refined in appearance.

These and other objects will be apparent to those skilled in the art.

Our invention consists in the construction, arrangements, and combination, of the various parts of the device, whereby the objects contemplated are attained as hereinafter more fully set forth, specifically pointed out in our claims, and illustrated in the accompanying drawings, in which:

FIG. 1 is a perspective view of our clamp in use;

FIG. 2 is an enlarged side view of the lever portion of the device prior to its final closing action;

FIG. 3 is an enlarged perspective view showing the device being closed and locked by use of a tool;

FIG. 4 is an enlarged side view of our device with sections cut away to more fully illustrate its construction;

FIG. 5 is an enlarged side view of the lever portion of the device in an unlocked condition;

FIG. 6 is an enlarged exploded view of our clamp means;

FIG. 7 is an enlarged cross-sectional view of the device on line 7—7 of FIG. 3;

FIG. 8 is an enlarged cross-sectional view of the device taken on line 7—7 of FIG. 3;

FIG. 9 is an enlarged cross-sectional view of our clamp taken on line 9—9 of FIG. 3.

In these drawings we have used the numeral 10 to designate a pipe, tube, post, shaft or like, having a circular periphery. It is around such a member that we install our clamp means and which we will now describe in detail. The numerals 11 and 12 generally designate two jaws. One end of each of these two jaws are hinged together by a rivet or like 13 as shown in FIG. 6. When the two jaws are closed their two curved inner edges produce a substantially perfect circle to engage at all points the periphery of the pipe or like 10, as shown in FIG. 1. The radius of curvature of the outer edge of each of the jaws 11 and 12 uniformly increases from each end along the circumference of each of the jaws. This provides greater strength at the center area of the jaws to counteract the relatively higher stress on the jaws in this area. As an integral part of the free end portion of the jaw 11, is a radially extending projection 15. This projection 15 has in its outer left side edge, a concave depression 16. As an integral part of the free end portion of the jaw 12, is a radially extending projection 17. This projection 17 has in its outer right side edge a concave depression 19. The two inner and adjacent side edges of the two projections 15 and 17 are radially straight as shown in FIG. 4, and when these two radially straight edges are in contact with each other the two jaws will be forming, by their inner edges, substantially a perfect circle. Extending through the jaw 11 and some distance from its free end is a hole 20. Extending through the jaw 12 and at some distance from its free end is a hole 21.

The lever portion of the device consists of two parts, i.e., a U-strap member 22 and a lever arm 23. The U-strap member 22 has its center inside area 25 formed in a convex face for detachably engaging either the concave bearing surface 16 of the projection 15, or the concave bearing surface 19 of the projection 17.

The lever arm 23 is, when closed, arcuate with one of the jaws. This lever arm is hinged near one end, to end between the two free end areas of the U-strap member 22 by a rivet or like 26. This end of the lever arm closest to the rivet 26 has a curved end 27 for slidably engaging either the concave depression 16 or the concave depression 19. Inasmuch as the distance from the rivet 26 to the free curved end 27 of the lever arm 23 is greater than that of the distance from the rivet 26 to the side of the lever arm 23, the lever arm when actuated on the jaws, has a cam action. A hole 29 extends through the outer free end portion of the cam lever arm. When the lever unit is placed on the jaws as shown in FIG. 2, the hole 29 will be spaced apart from the hole 20 of the jaw 11.

A tool 30 of the plier type having two pointed jaw ends 31 and 32 may be used to facilitate the manual movement of the outer free end of the lever arm toward the adjacent jaw, as shown in FIG. 3. The lowering of the free end of the lever arm 23 onto the jaw 11, will act as a cam lever drawing the link U-strap 22 to the left thereby bringing the ends 15 and 17 of the jaws 11 and 12, respectively, together. When the tool 30 is removed the cam lever arm will be past center of its pivot point and engagement with the bearing depression 16, and it will remain in locked position as shown in FIG. 4. Since the jaws are wider in the area of the holes 20 and 21, they will resist the pressure placed on them by the tool 30 thereby avoiding any deformation of the jaws. If, for certain conditions, it is handier to move the lever arm to the right onto the jaw 12, it is merely necessary to reverse the lever unit, or turn the jaws 11 and 12 around. If the lever unit is reversed, the curved end of the strap 22 will engage the depression 16, and the cam curved end 27 of the lever arm will bear in the depression 19 of the jaw 12. If the tool 30 is used, its prongs are extended through the holes 29 and 21. The holes 20 and 21 may be also used for securing members to our clamp means.

When the two jaws are closed as shown in FIG. 3, the inside periphery of the closed clamp will be a perfect circle, engaging the pipe or like 10 at all points around its circumference.

Some changes may be made in the construction and arrangement of our clamp means without departing from the real spirit and purpose of our invention, and it is our intention to cover by our claims, any modified forms of structure or use of mechanical equivalents which may be reasonably included within their scope.

We claim:
1. In a clamp means, comprising, in combination,
   (a) a first curved jaw,
   (b) a second curved jaw,
   (c) means for pivoting one end of one jaw to one end of the other jaw,

(d) a projection on the free end of said first jaw,
(e) a projection on the free end of said second jaw,
(f) a U-shaped strap member detachably embracing one of said projections, and
(g) a cam lever pivoted to said U-shaped strap member contacting said other projection, said other projection adapted to be selectively embraced by said U-shaped strap and said one projection engaged by said cam lever;
(h) said cam lever having a hole adjacent its outer free end and said jaws each having a hole extending through it, said hole in said one jaw and said hole in said cam lever being adjacent each other when said lever is in engagement with said other projection, and said other projection adapted to be selectively embraced by said U-shaped strap and said one projection engaged by said cam lever with said hole in said other of said jaws and said holes in said cam lever being adjacent each other, said hole being of such a size to receive the jaws of a pliers type tool to facilitate closing the clamp.

2. In a clamp means, comprising,
(a) a first curved jaw,
(b) a second curved jaw,
(c) mean for pivoting one end of one jaw to one end of the other jaw,
(d) the width of each of said jaws progressively increasing from its ends towards its center area,
(e) a projection on the free end of each of said first and second jaws,
(f) a U-shaped strap member embracing one of said projections,
(g) a cam lever pivoted to the free ends of said U-shaped strap member and adapted to contact said other projection, and
(h) said cam lever and said jaws each having a hole extending through it, said holes in one of said jaws and said cam lever being adjacent each other when said lever is in engagement with the projection carried by said one jaw.

3. In a clamp means, comprising,
(a) a first curved jaw,
(b) a second curved jaw,
(c) means for pivoting one end of one jaw to one end of the other jaw,
(d) the width of each of said jaws progressively increasing from its ends toward its center area,
(e) a projection having a concave outer edge on the free end of said first jaw,
(f) a projection having a concave outer edge on the free end of said second jaw,
(g) a U-shaped strap member embracing one of said projections, the center inside area of said strap member having a convex face,
(h) a cam lever pivoted to the free ends of said U-shaped strap member and adapted to engage the other of said projections, and
(i) said cam lever and said jaws each having a hole extending through it, said holes in one of said jaws and said cam lever being adjacent each other when said lever is in engagement with the projection carried by said one jaw.

References Cited by the Examiner

UNITED STATES PATENTS

| | | | |
|---|---|---|---|
| 520,107 | 5/94 | Engel | 24—250 X |
| 778,562 | 12/04 | Zesiger | 81—3.43 |
| 845,118 | 2/07 | Pheasant | 81—66.1 |
| 1,442,209 | 1/23 | Yoders | 24—270 |
| 1,883,041 | 10/32 | Somers | 24—285 |
| 2,479,580 | 8/49 | Marco | 24—270 X |
| 2,752,174 | 6/56 | Frost | 24—270 X |

FOREIGN PATENTS

| | | |
|---|---|---|
| 663,925 | 4/29 | France. |
| 412,186 | 6/34 | Great Britain. |

DONLEY J. STOCKING, *Primary Examiner.*

ABRAHAM G. STONE, *Examiner.*